(12) United States Patent
Chiku et al.

(10) Patent No.: US 7,172,232 B2
(45) Date of Patent: Feb. 6, 2007

(54) CONSOLE FOR VEHICLE

(75) Inventors: Shigenobu Chiku, Takanezawa-machi (JP); Hideki Kobayashi, Takanezawa-machi (JP)

(73) Assignee: TS Tech Co., Ltd, Saitama-Ken (JP)

( * ) Notice: Subject to any disclaimer, the term of this patent is extended or adjusted under 35 U.S.C. 154(b) by 89 days.

(21) Appl. No.: 11/079,782

(22) Filed: Mar. 14, 2005

(65) Prior Publication Data
US 2005/0206179 A1 Sep. 22, 2005

(30) Foreign Application Priority Data
Mar. 16, 2004 (JP) .............................. 2004-073822

(51) Int. Cl.
*B60N 3/00* (2006.01)
(52) U.S. Cl. .............................. 296/24.34; 296/37.14; 296/37.1
(58) Field of Classification Search ............. 296/24.34, 296/37.14, 37.18
See application file for complete search history.

(56) References Cited

U.S. PATENT DOCUMENTS

| | | | |
|---|---|---|---|
| 4,148,516 A * | 4/1979 | Gotomyo | 296/37.1 |
| 4,809,897 A * | 3/1989 | Wright, Jr. | 224/282 |
| 5,345,784 A * | 9/1994 | Bazemore et al. | 62/371 |
| 5,458,353 A * | 10/1995 | Hanemaayer | 296/37.14 |
| 5,520,313 A * | 5/1996 | Toshihide | 296/37.12 |
| 6,033,003 A * | 3/2000 | Bell et al. | 296/37.3 |
| 6,378,325 B1 * | 4/2002 | Yang | 62/371 |
| 6,467,829 B2 * | 10/2002 | Kaluszka et al. | 296/37.14 |
| 6,474,715 B2 * | 11/2002 | Fukushima et al. | 296/37.1 |
| 6,502,886 B1 * | 1/2003 | Bleau et al. | 296/37.14 |
| 6,695,380 B1 * | 2/2004 | Hicks | 296/37.14 |
| 6,719,343 B2 * | 4/2004 | Emerling et al. | 296/24.34 |
| 6,719,347 B2 * | 4/2004 | Gehring et al. | 296/37.14 |
| 6,752,304 B1 * | 6/2004 | Hotary et al. | 296/37.14 |
| 6,799,433 B1 * | 10/2004 | Gleason et al. | 62/457.9 |
| 6,811,196 B2 * | 11/2004 | Gammon | 296/37.16 |
| 6,832,412 B2 * | 12/2004 | Kim | 16/354 |
| 6,866,319 B2 * | 3/2005 | Hupfer | 296/37.8 |
| 6,874,667 B2 * | 4/2005 | Dykstra et al. | 224/498 |
| 6,929,304 B1 * | 8/2005 | Dry et al. | 296/37.8 |
| 7,017,980 B1 * | 3/2006 | Bejin et al. | 296/37.14 |

* cited by examiner

*Primary Examiner*—Kiran B. Patel
(74) *Attorney, Agent, or Firm*—Sacco & Associates, PA; Robert J. Sacco

(57) ABSTRACT

A console for vehicle, which has an improved usefulness with respect to the accommodation of goods or the like, is disclosed. The console comprises: a first concave portion arranged to accommodate goods, the first concave portion having a first opening on a top side opened or closed by a first cover; and a second concave portion arranged to accommodate goods and provided downwardly of the first concave portion having a second opening in the same plane as a bottom of the first concave portion, the second opening being opened or closed by a second lid. The console is structured thus way, whereby it can be moved to an appropriate location in the inside of a vehicle and placed thereon, while it has enlarged spaces for accommodating goods, and thus it has an improved usefulness.

4 Claims, 4 Drawing Sheets

CONSOLE FOR VEHICLE

BACKGROUND OF THE INVENTION

1. Field of the Invention

The present invention relates to a console for vehicle provided in the inside of a vehicle for accommodating goods therein.

2. Description of the Related Art

Japanese Unexamined Patent Publication No. 2002-96686 discloses a conventional console box which comprises a container member accommodating goods and a console lid openably and closably hinged to the container member so as to close it. This console box is provided with an illumination apparatus which comprises: a lamp case provided on a rear surface of the console lid and having a bulb thereinside; an illumination slit formed on the lamp case; and a rotation mechanism for changing an angle of the illumination slit. According to this console box, by changing the illumination angle of the illumination apparatus appropriately in response to a sitting position of a passenger, the passenger's hand can be illuminated from his/her behind with him/her sitting on a front seat without bothering a driver. Therefore, the user can read a map or book, etc., without taking an uncomfortable sitting posture. Moreover, the container member can be illuminated, and thus it is easy to take out or accommodate goods in the night.

Meanwhile, a conventional console box is fixed to a predetermined position in the inside of a vehicle, while a space thereof for accommodating goods therein is limited, whereby it has a poor usefulness.

The present invention has been made to solve the above problem. It is, accordingly, an object of the present invention to provide a console for vehicle which has a good usefulness with respect to the accommodation of goods or the like.

SUMMARY OF THE INVENTION

In order to attain the above object, according to a first aspect of the present invention, there is provided a console for vehicle which comprises: a first concave portion arranged to accommodate goods, the first concave portion having a first opening on a top side opened or closed by a first cover, or left uncovered; and a second concave portion arranged to accommodate goods and provided downwardly of the first concave portion having a second opening in the same plane as a bottom of the first concave portion, the second opening being opened or closed by a second lid.

By employing the above-identified structure, the console can be moved to an appropriate location in the inside of a vehicle and placed thereon, while it has enlarged spaces for accommodating goods, and thus it has an improved usefulness.

Alternatively, in the above-described console for vehicle, a mat may be put down on the bottom of the first concave portion, the mat hiding the second lid closing the second opening of the second concave portion.

Since the second concave portion is hidden by the mat, the usefulness of the console can be improved.

Moreover, the above-described console for vehicle may further comprise an interlock means for interlocking the second lid with an upper end portion of the second concave portion.

Accordingly, the second lid can be stably interlocked with the upper portion of the second concave portion by the interlock means.

Further, the interlock means may comprise: an engagement member for engaging one end of the second lid with the upper end portion of the second concave portion; and an interlock member for interlocking the other end of the second lid with the upper end portion of the second concave portion.

According to the above-described structure, the one end of the second lid can be engaged with the upper end portion of the second concave portion, while the other end thereof can be interlocked with the upper end portion, whereby the second lid can be removably interlocked with the second concave portion.

The above-described console may be placed on a back face of a sub-seat in an inside of a vehicle with an upper face of a seat cushion thereof and a front face thereof being folded so as to face with each other.

In order to attain the above object, according to a second aspect of the present invention, there is provided a console for vehicle which comprises: a first space for accommodating goods; a mat put down on one surface of the first space; and a second space hidden by the mat.

Alternatively, the above-described console for vehicle may further comprise a lid provided in the same plane as the one surface of the first space covered by the mat so as to cover the second space.

Moreover, the above-described console for vehicle may further comprise a lid covering the first space.

BRIEF DESCRIPTION OF THE DRAWINGS

These objects, other objects and advantages of the present invention will be more apparent upon reading of the following detailed description and the accompanying drawings in which.

DETAILED DESCRIPTION OF THE PREFERRED EMBODIMENT

Figure 1:
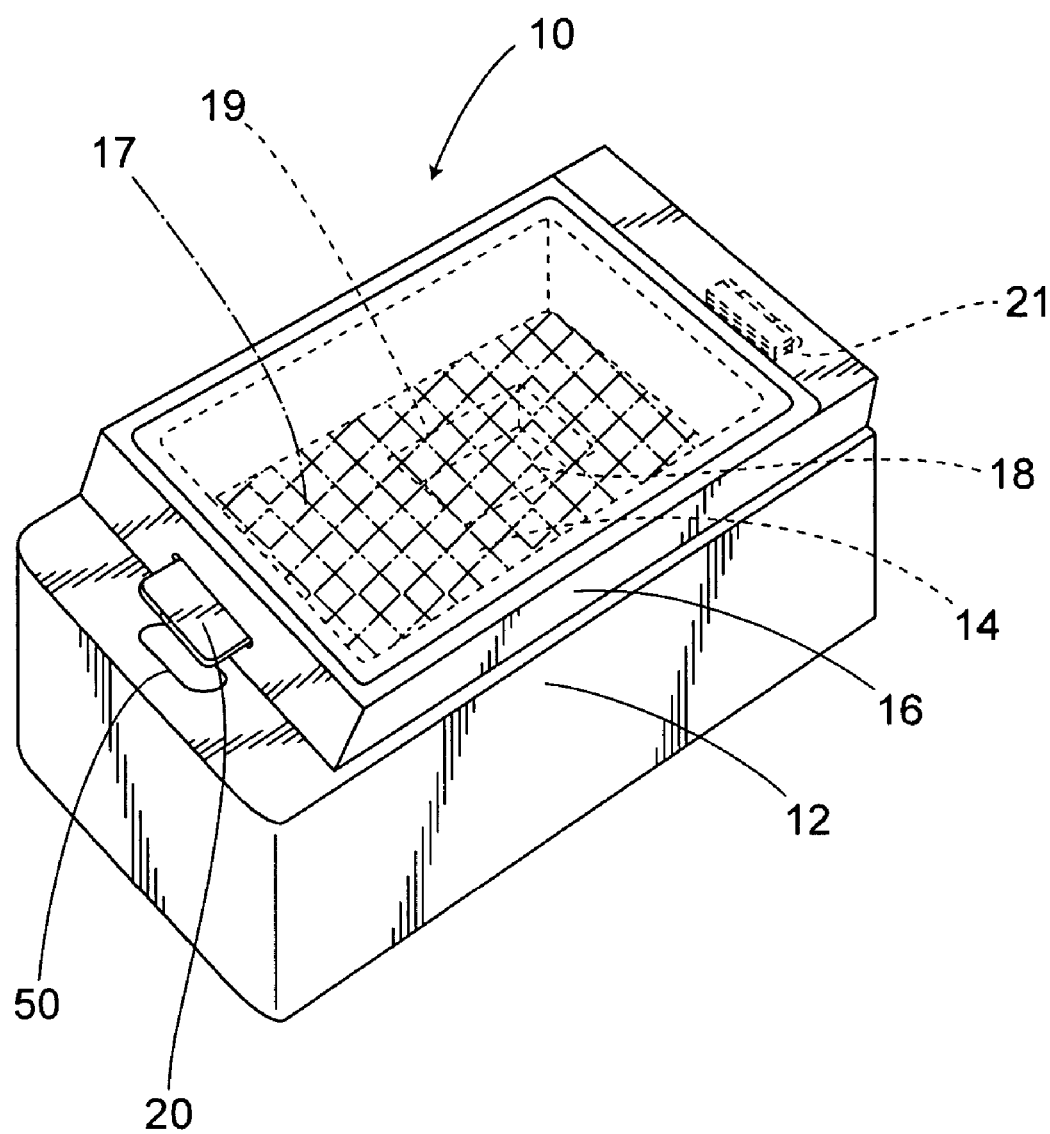
FIG. 1 is a perspective view illustrating a console for vehicle according to an embodiment of the present invention.
Figure 2:
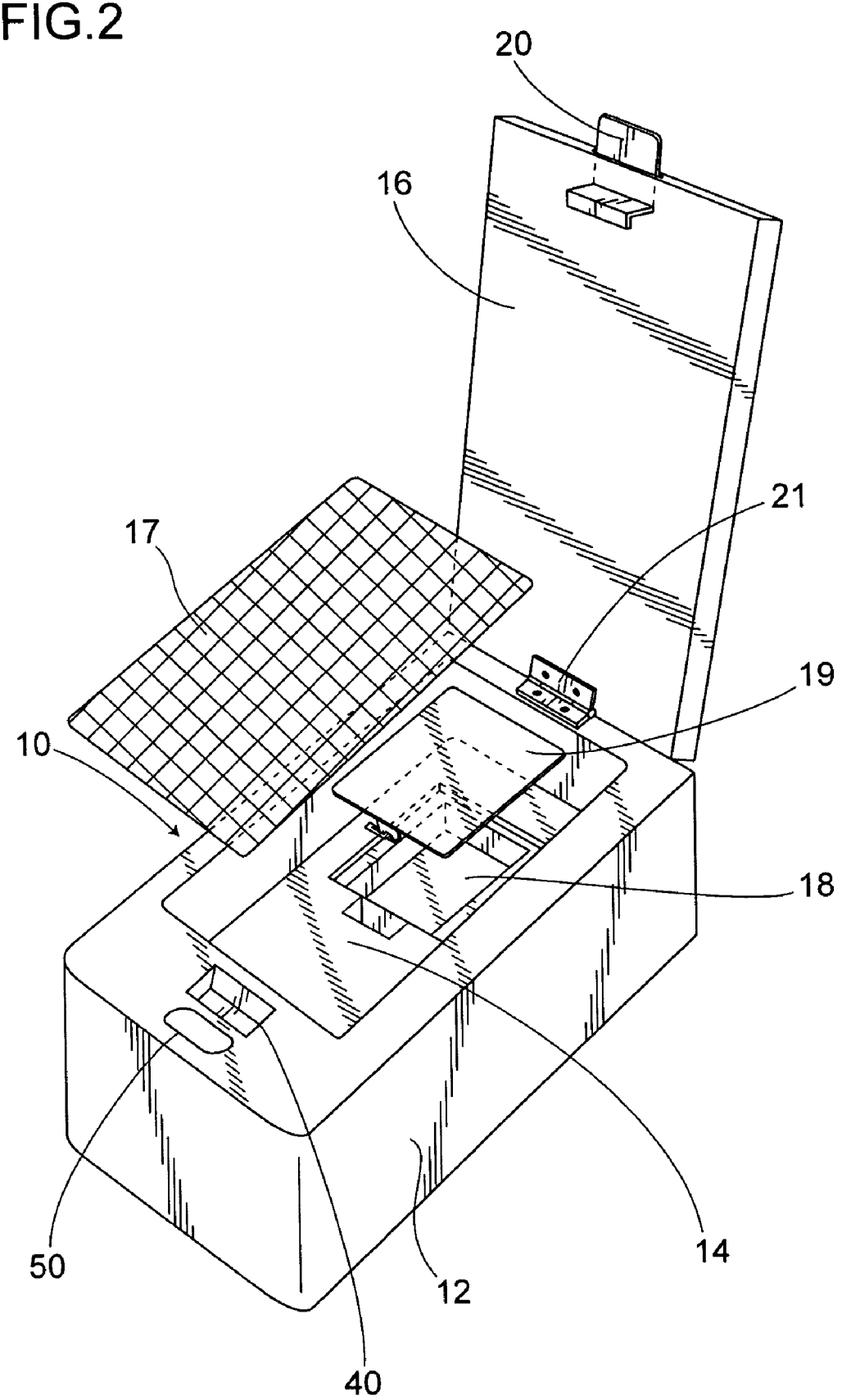
FIG. 2 is a perspective view illustrating the console for vehicle with a first and second covers being opened.

A preferred embodiment of the present invention will now be described with reference to the accompanying drawings. FIGS. 1 to 4B are for explaining a console for vehicle according to an embodiment of the present invention.

As illustrated, a console 10 is formed in a substantially rectangular-box shape. The console 10 has a console body 12. A first concave portion 14 of substantially rectangular is provided on a substantial center of an upper portion of the console body 12 in a manner opening a top side thereof so that it can accommodate goods. A first lid 16 is provided upwardly of the first concave portion 14 in a manner opening or closing an opening thereof. Moreover, a mat 17 such as an opaque needle punch carpet is put down on a bottom of the first concave portion 14.

A second concave portion 18 of substantially rectangular is provided downwardly of the first concave portion 14 in a manner opening a top side thereof so that it can accommodate goods. A second lid 19 is provided upwardly of the second concave portion 18 in a manner opening or closing an opening thereof. The second lid 19 covering the opening of the second concave portion 18 is hidden by the mat 17 put down on the bottom of the first concave portion 14.

A rear end portion of the first lid 16 is provided with a hinge 21 in which one end thereof is fixed to the console body 12, while the other end thereof is fixed to the first lid 16, whereby the first lid 16 can openably and closably move in an upper or lower direction thereof.

Figure 3A:
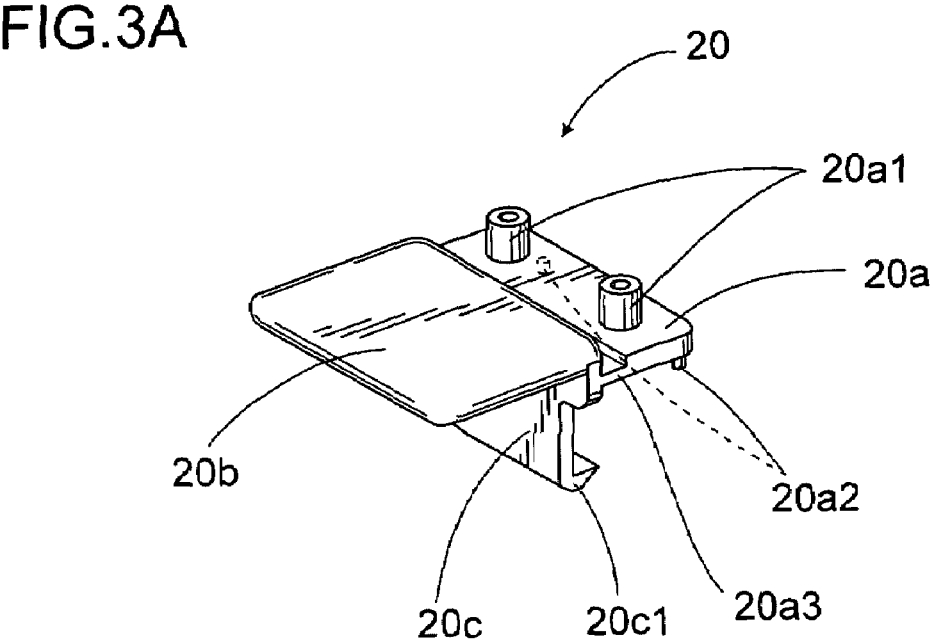
FIGS. 3A and 3B are views each illustrating a handle member of FIG. 2.

In contrast, a front end portion of the first lid 16 is provided with a handle member 20 in a manner protruding from a front surface of the first lid 16 for openably and closably moving the first lid 16. As illustrated in FIG. 3A, the handle member 20 is formed in a substantially letter "T" shape when viewed from one side thereof. The handle member 20 comprises: a fixing portion 20a of tabular for fixing the handle member 20 on the first lid 16; a handling portion 20b of tabular formed to be substantially parallelized with the fixing portion 20a and protruding from the front surface of the first lid 16 so as to be held by fingers or the like when the first lid 16 is openably and closably moved; and a latching portion 20c of tabular formed to be substantially perpendicular to the fixing portion 20a and the handling portion 20c so as to be inserted in a rectangular opening 40 which is formed on a portion of the console body 12 in the front of the first concave portion 14, while a long side thereof is in parallel with a right-left direction of the console body 12. An upper surface of the fixing portion 20a is formed with cylindrical portions 20a1, while male screws each comprising a head portion and a thread portion are inserted in the cylindrical portions 20a1 for fixing the handle member 20 on the first lid 16. A lower surface of the fixing portion 20a is formed with dowels 20a2 for positioning the handle member 20 with respect to the first lid 16. Meanwhile, on portions of the first lid 16 corresponding to the dowels 20a2, holes which fit the dowels 20a2 are formed so that the lower surface of the fixing portion 20a can contact a surface of the first lid 16 for fixing the fixing portion 20a. The fixing portion 20a is joined to a rear surface of the latching portion 20c, while a jointing portion 20a3 thereof is formed to be thinner than the other portions of the fixing portion 20a. Edges of the handling portion 20b are formed in arc shapes. The handling portion 20b and the latching portion 20c are joined with each other so as to be a substantially letter "L" shape when viewed from one side thereof. A lower end portion 20c1 of the latching portion 20c is bent toward the rear of locking portion 20c so that the handle member 20 can interlock with a lower end portion of the rectangular opening 40 formed on the portion of the console body 12 in the front of the first concave portion 14.

Figure 3B:
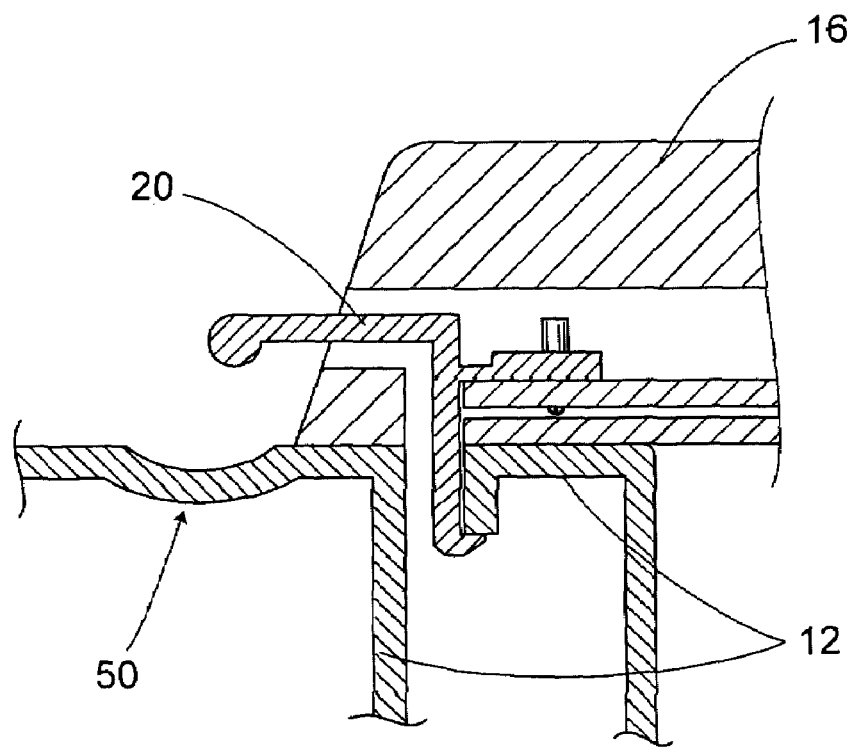

As illustrated in FIG. 3B, when the opening of the first concave portion 14 is closed by the first lid 16, the lower end portion 20c1 of the latching portion 20c interlocks with the lower end portion of the rectangular opening 40 formed on the console body 12, whereby the first lid 16 interlocks with the console body 12. Meanwhile, a concave portion 50 formed in an arc shape when viewed from a cross sectional surface thereof is provided on the upper surface of the console body 12 in the front of the rectangular opening 40. Moreover, when the first lid 16 is opened in order to open the opening of the first concave portion 14 of the console body 12, the handling portion 20b of the handle member 20 is pushed upwardly, and thus the interlock of the lower end portion 20c1 of the latching portion 20c with the lower end portion of the rectangular opening is released. Meanwhile, the handling portion 20b and the latching portion 20c of the handle member 20 are arranged to rotate with the jointing portion 20a3 taken as a center of the rotation.

Figure 4A:
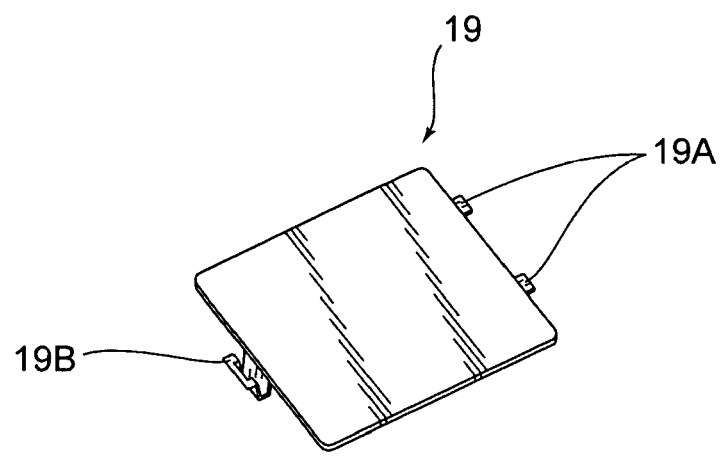
FIGS. 4A and 4B are views each illustrating the second cover of FIG. 2.
Figure 4B:
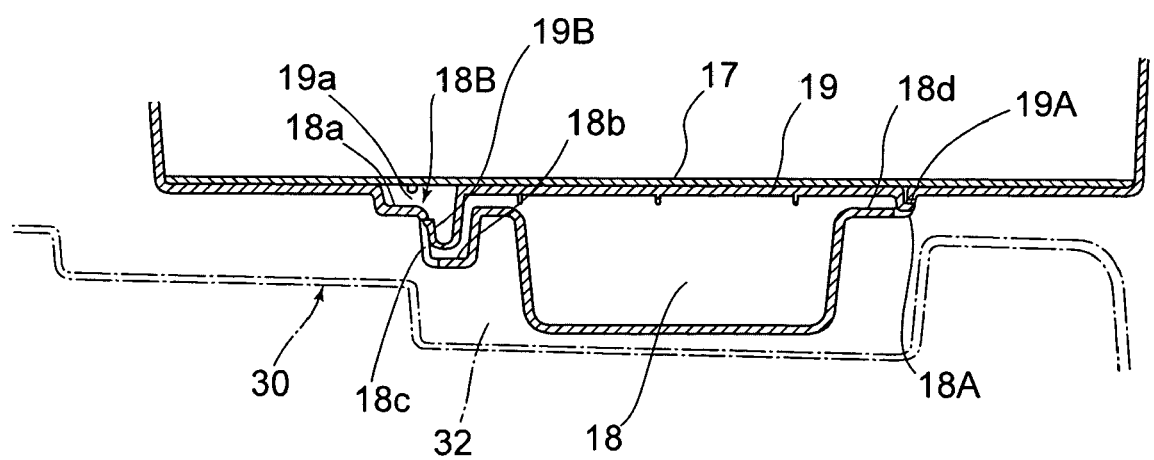

FIG. 4A is a perspective view illustrating the second lid 19, while FIG. 4B is a cross sectional view of the second concave portion 18 along a front-rear line thereof. The second lid 19 is formed in a substantially rectangular and tabular shape. The console 10 is provided with an interlock means for interlocking the second lid 19 with an upper end portion of the second concave portion 18. The interlock means comprises: an engagement member for engaging a rear end of the second lid 19 with an upper end portion of the second concave portion 18; and an interlock member for interlocking a front end of the second lid 19 with the upper end portion of the second concave portion 18. The engagement member comprises: convex engagement portions 19A provided on the rear end of the second lid 19 in a manner protruding therefrom; and engagement openings 18A provided on the upper end portion of the second concave portion 18 so as to engage with the convex engagement portion 19A. The interlock member comprises: a convex interlock portion 19B provided on the front end of the second lid 19 in a manner protruding therefrom; and a concave interlock portion 18B provided on the upper end portion of the second concave portion 18 and engaging with the convex interlock portion 19B. The convex interlock portion 19B is formed in a substantially letter "U" shape when viewed from one side thereof. Moreover, a front surface of the convex interlock portion 19B is formed with a rectangular opening 19a. A lower end of the rectangular opening 19a of the convex interlock portion 19B is formed to protrude toward the front of the second lid 19. Meanwhile, the convex interlock portion 19B is formed in a shape that an aperture of the letter "U" becomes narrow when an upper end thereof is pressed by a finger or the like toward the rear of the second lid 19. The concave interlock portion 18B is formed in a substantially rectangular shape. Moreover, on a front portion of the concave interlock portion 18B, a front concave interlock portion 18a is formed so as to open the front end thereof. The front concave interlock portion 18a is formed in a manner providing a space for a finger or the like in between a front portion of the front concave interlock portion 18a and the front surface of the convex interlock portion 19B with the second lid 19 engaged with the console body 12. In contrast, on a rear portion of the concave interlock portion 18B, a rear concave interlock portion 18b, which is connected to the front concave interlock portion 18a and extend downwardly from a bottom surface thereof, is provided. On a front side of the rear concave interlock portion 18b, a rectangular opening 18c is provided.

The second lid 19 engages with the console body 12 by allowing the convex engagement portions 19A to engage with the engagement openings 18A, and allowing the lower end of the rectangular opening 19a of the convex interlock portion 19B to interlock with an upper end of the rectangular opening 18c of the rear concave interlock portion 18b. Moreover, the second lid 19 is released from the console body 12 by releasing the engagement of the lower end of the rectangular opening 19a of the convex interlock portion 19B with the upper end of the rectangular opening 18c of the rear concave interlock portion 18b, and the engagement of the convex engagement portions 19A with the engagement openings 18A when the upper end of the convex interlock portion 19B is pressed by a finger or the like. Meanwhile, on the upper portion of the second concave portion 18, a notch 18d, which is positioned downwardly of the bottom of the first concave portion 14 and support a bottom surface of the second lid 19, is provided.

The mat 17 such as an opaque needle punch carpet can be put down on the bottom of the first concave portion 14.

Meanwhile, the second concave portion 18 of the console body 12 is formed in a shape such that it can be fitted into a concave portion 32 of a frame in a back face of a seat back of a sub-seat 30. For instance, in this embodiment, the console 10 is placed on the back face of the sub-seat 30 with an upper face of a seat cushion of the sub-seat and a front face of the seat back thereof being folded so as to face with each other.

Next, a method how to remove the second lid 19 from the upper end portion of the second concave portion 18 will now be explained. First of all, the first lid 16 is opened. Next, the mat 17 on the bottom of the first concave portion 14 is removed, and then the interlock of the second lid 19 with the upper portion of the second concave portion 18 is released, whereby the second lid 19 can be removed from the console body 12.

As described, according to this embodiment of the present invention, the console 10 has a first concave portion 14 for accommodating goods whose opening is opened or closed by the first lid 16. A second concave portion 19 for accommodating goods, whose opening in the same plane as the bottom of the first concave portion 14 is opened or closed by the second lid 19, is provided downwardly of the first concave portion 14. Therefore, the console 10 can be moved to an appropriate location in the inside of a vehicle and placed thereon, while it has enlarged spaces for accommodating goods, and thus it has an improved usefulness.

Moreover, according to this embodiment, the mat 17, which covers the second lid 19 for the second concave portion 18, is put down on the bottom of the first concave portion 14 so as to hide the second lid 19, whereby a usefulness of the console 10 with the second concave portion 18 hidden can be improved.

The present invention is not limited to the above-described embodiment. Various embodiments and changes may be made thereonto without departing from the broad spirit and scope of the invention.

What is claimed is:

1. A console for vehicle comprising:
    a first concave portion of said console defined by an interior surface comprised of a bottom surface and at least one side wall, said first concave portion arranged to accommodate goods, said first concave portion having a first opening on a top side opposed from said bottom opened or closed by a first lid, or left uncovered;
    a second concave portion of said console comprising a recess in said bottom surface of said first concave portion arranged to accommodate goods and having a second opening being opened or closed by a second lid, and
    a mat located on the bottom of said first concave portion, said mat hiding said second lid.

2. The console for vehicle according to claim 1, further comprising an interlock means for interlocking said second lid with an upper end portion of said second concave portion.

3. The console for vehicle according to claim 2, wherein said interlock means comprises: an engagement member for engaging one end of said second lid with the upper end portion of said second concave portion; and an interlock member for interlocking another end of said second lid with the upper end portion of said second concave portion.

4. The console for vehicle according to claim 1, wherein the console is placed on a back face of a sub-seat in an inside of a vehicle with an upper face of a seat cushion thereof and a front face thereof being folded so as to face with each other.

* * * * *